United States Patent [19]
Luch et al.

[11] Patent Number: 5,415,306
[45] Date of Patent: * May 16, 1995

[54] FOIL LINED SNAP-ON, SCREW-OFF CLOSURE AND CONTAINER NECK

[75] Inventors: Daniel Luch, Los Gatos, Calif.; Johnny S. Henson, Mt. Carmel, Tenn.; Richard E. Repp, San Jose, Calif.

[73] Assignee: Portola Packaging, Inc., San Jose, Calif.

[*] Notice: The portion of the term of this patent subsequent to Mar. 2, 2010 has been disclaimed.

[21] Appl. No.: 951,653
[22] Filed: Sep. 25, 1992

Related U.S. Application Data

[63] Continuation-in-part of Ser. No. 830,133, Jan. 31, 1992, Pat. No. 5,267,661, which is a continuation-in-part of Ser. No. 772,945, Oct. 8, 1991, Pat. No. 5,213,224, which is a continuation-in-part of Ser. No. 565,638, Aug. 9, 1990, Pat. No. 5,190,178.

[51] Int. Cl.$^6$ .............................................. B65D 39/00
[52] U.S. Cl. ............................ 215/256; 215/232; 215/318; 215/351; 220/258; 220/270; 220/276; 220/359
[58] Field of Search ................ 215/232, 253, 254, 256, 215/318, 351; 220/258, 270, 276, 359

[56] References Cited

U.S. PATENT DOCUMENTS

| | | |
|---|---|---|
| 1,630,687 | 11/1924 | Aulbach . |
| 2,181,340 | 11/1939 | Plumb . |
| 3,022,917 | 2/1962 | Montgomery . |
| 3,223,269 | 12/1965 | Williams . |
| 3,695,475 | 10/1972 | Ruekberg . |
| 3,837,518 | 9/1974 | Gach . |
| 3,844,443 | 10/1974 | Cudzik . |
| 3,874,540 | 4/1975 | Hidding . |
| 3,902,621 | 9/1975 | Hidding . |
| 3,980,195 | 9/1976 | Fillmore . |
| 4,078,700 | 3/1978 | Hidding . |
| 4,241,841 | 12/1980 | Boller . |
| 4,298,129 | 11/1981 | Stull . |
| 4,354,609 | 10/1982 | Hidding . |
| 4,385,708 | 5/1983 | Curry . |
| 4,402,415 | 9/1983 | Hopley . |
| 4,448,319 | 5/1984 | Kern . |
| 4,484,687 | 11/1984 | Bullock, III . |
| 4,530,437 | 7/1985 | Gray et al. . |
| 4,531,649 | 7/1985 | Shull ................. 215/232 |
| 4,540,102 | 9/1985 | Wiedmer . |
| 4,548,329 | 10/1985 | Curry . |
| 4,561,553 | 12/1985 | Crisci . |
| 4,605,136 | 8/1986 | Debetencourt .......... 215/232 |
| 4,625,875 | 12/1986 | Carr et al. . |
| 4,700,860 | 10/1987 | Li . |
| 4,722,447 | 2/1988 | Crisci ................ 215/232 |
| 4,739,891 | 4/1988 | Bullock, III . |
| 4,744,478 | 5/1988 | Hahn . |
| 4,754,890 | 7/1988 | Ullman et al. .......... 215/232 |
| 4,796,770 | 1/1989 | Begley . |
| 4,815,617 | 3/1989 | Cullum . |
| 4,828,128 | 5/1989 | Tackles . |
| 4,844,250 | 7/1989 | Holoubek . |
| 4,872,571 | 10/1989 | Crecelius et al. ........ 215/232 |
| 4,893,718 | 1/1990 | Delespaul et al. ....... 215/232 |
| 4,934,546 | 6/1990 | Markley . |
| 4,946,055 | 8/1990 | Towns et al. . |
| 4,981,229 | 1/1991 | Lanham ................ 215/232 |
| 4,981,230 | 1/1991 | Marshall et al. . |
| 4,989,740 | 2/1991 | Vercillo . |
| 5,121,845 | 6/1992 | Blanchard ............. 215/232 |
| 5,129,530 | 7/1992 | Fuchs . |
| 5,197,621 | 3/1993 | Bartl et al. ........... 215/331 |

FOREIGN PATENT DOCUMENTS

| | | |
|---|---|---|
| 812597 | 5/1969 | Canada . |
| 0118267 | 10/1986 | European Pat. Off. . |
| 1154369 | 9/1963 | Germany . |
| 2356007 | 5/1974 | Germany . |
| 2105693 | 3/1983 | United Kingdom . |

*Primary Examiner*—Allan N. Shoap
*Assistant Examiner*—Stephen Cronin
*Attorney, Agent, or Firm*—Julian Caplan; Janet E. Muller; Flehr, Hohbach, Test, Albritton & Herbert

[57] ABSTRACT

A tamper-evident, snap-on, screw-off closure which is used with a specially shaped container neck is provided with a foil liner. Once the closure is applied to the neck, the foil liner is sealed to the neck of the container. The foil liner includes a tab for removal of the seal disc from the neck. The closure is characterized by the absence of a second liner between the top of the cap and the foil liner. The cap and the foil liner are formed to inhibit adherence of the tab to the interior of the cap.

9 Claims, 2 Drawing Sheets

FOIL LINED SNAP-ON, SCREW-OFF CLOSURE AND CONTAINER NECK

CROSS REFERENCE TO RELATED APPLICATIONS

This application is a continuation-in-part of U.S. application Ser. No. 07/830,133, filed Jan. 31, 1992, now U.S. Pat. No. 5,267,661, issued Dec. 7, 1993, which is a continuation-in-part of U.S. application Ser. No. 07/772,945, filed Oct. 8, 1991, now U.S. Pat. No. 5,213,224, issued May 25, 1993, which is a continuation-in-part of U.S. application Ser. No. 07/565,638, filed Aug. 9, 1990, now U.S. Pat. No. 5,190,178, issued Mar. 2, 1993. The disclosures of the abovementioned applications are hereby incorporated herein by reference.

BACKGROUND OF THE INVENTION

1. Field of the Invention

The present invention relates in general to a tamper-evident container closure and a container neck structure. More particularly, the present invention relates to a closure having a foil disc. The closure is applied to the neck with an axial downward force without rotation relative to the container, with the foil disc sealing the neck of the container. After the tamper-evident feature of the closure is removed, the cap may be screwed onto and off the container as a reclosure cap.

2. Description of the Related Art

Many closure systems include foil liner seals to cover the neck opening, providing evidence of tampering and preserving the freshness of the product. The commercially available foil seals usually have an adhesive substance applied on one surface of the seal. When applied to the neck, the adhesive-coated surface is placed in contact with the neck structure surrounding the opening. The foil seal discs are generally adhered to the container by induction heating or other means. The foil disc is typically initially inserted into the cap and sealed to the neck of the container during the capping process, facilitating installation of the liner seal.

Many of the available foil liner seals are formed with a tab which may be gripped by the consumer to remove the seal and open the container. As is shown in U.S. Pat. No. 4,739,891, the tab is folded back across the main body of the foil disc when inserted into the closure. A paper liner preferably separates the foil disc from the interior of the cap, preventing adherence of the tab to the underside of the cap when the foil disc is sealed to the neck. Without the paper liner, the tab bonds to the cap and may pull the foil disc from the neck when the cap is initially opened. The premature breaking of the seal provides a false indication of tampering.

The snap-on, screw-off structures available in the prior art are of two general types-those having thread engagement as initially applied, and those without initial thread engagement. Examples of closure systems having no-thread initial engagement are those taught by U.S. Patent No. 4,561,553 to Crisci, and U.S. Pat. No. 4,946,055 to Towns et al. The no-thread initial engagement system has the major advantages of being simple to manufacture and apply and of achieving good re-seal on reclosure through the thread torque. However, using a foil disc initially inserted in the cap with this system is impractical. Furthermore, the requirement of twisting the closure relative to the neck after the container is initially opened by a lifting motion is confusing to the consumer.

Systems having partial to full thread engagement on initial application have several advantages over the no-thread system, including the ability to effectively use a foil disc to seal the neck of the container. Consumer confusion is also eliminated, since the cap is initially removed from the container by twisting. However, the initial thread engagement systems do not offer the manufacturing and application advantages available with the no-thread system. With some systems, the closure must be twisted relative to the container at some point during the application process in order to seat the cap on the neck. An example of such a closure is shown in U.S. Pat. No. 4,625,875 to Carr. Other concepts, such as that taught by Miskin in the European Patent Specification No. 0 118 267 do not require orientation or twisting during application, and accommodate the inevitable closure height variation after application by employing an extended plug to seal against the inside bore of the container neck. The systems taught by Carr and Miskin both suffer from the requirement that the tamper evident band must be expanded over a restrictive container bead during the application process, which leads to difficulties. Furthermore, the bridges joining the removable band to the cap require mold slides for formation, a feature which greatly increases the cost and complexity of injection molding tooling.

Other systems available in the art include screw-on, screw-off structures which also offer the advantages of initial thread engagement and elimination of consumer confusion. An example of this type of closure is shown in U.S. Pat. No. 3,980,195 to Fillmore. The system taught by Fillmore includes a threaded, tamper-evident closure with a removable band. The interior of the removable band is formed with a one-way ratchet, which cooperates with projections formed on the neck to prevent unscrewing of the container. When the closure is initially twisted onto the container, the ratchet teeth slip over the projections on the neck. The application process used with the screw-on, screw-off systems is quite complex, since the cap must be turned or rotated relative to the container until the closure is fully seated. Furthermore, the frangible connections between the tamper-evident band and the closure must be sufficiently strong to prevent partial separation when the cap is twisted onto the container, increasing the costs of manufacture and the difficulty with which the band is removed from the container.

This invention provides a snap-on, screw-off system with partial or full thread initial engagement by reason of a unique thread design, a unique tamper-evident band and optional means for orienting the closure and container threads to achieve registration prior to straight axial application. A foil disc seals the neck opening of the container, providing evidence of tampering. The present invention offers considerable advantages over prior structures as is evident from the description of the related art and the following description of the invention.

SUMMARY OF INVENTION

The present invention comprises an improved closure or cap and an improved neck finish, with which a seal disc is used to seal the neck opening of the container. The cap skirt and neck finish are of the type having mating threads of such shape that the cap may be applied in a simple downward vertical movement without relative rotation, the cap skirt flexing sufficiently to permit the threads to slip past each other.

The neck finish of the present invention includes a downward extending neck stretch portion having at least one helical thread formed on the neck exterior. The closure has a downward extending upper skirt portion depending from a top, the upper skirt portion being adapted to fit over the neck stretch portion. At least one helical thread is formed on the interior of the upper skirt portion, and is shaped to mate with the helical thread formed on the neck.

The closure of the present invention is applied to the neck in a direct, axial downward direction without relative rotation of the neck and the closure. The helical threads are shaped, and the closure is resilient, so that the threads will slip past each other and interengage when the closure is directly applied to the container. The interengagement of the threads requires that the closure be unscrewed for removal from the container. To provide evidence of tampering with the contents of the container, the neck includes a tamper-evident structure which cooperates with a tamper-evident structure on the closure. The tamper-evident structures interengage when the closure seats on the neck to restrain unscrewing of the closure with the tamper-evident structures intact.

A seal disc is positioned underneath the top of the cap, and is formed for covering the neck opening of the container. Once the cap is applied to the container, the seal disc is substantially sealed around the neck opening. The seal disc provides further evidence of tampering, as the consumer must remove the disc from the neck when initially opening the container. A tab joined to the seal disc assists the consumer in removing the disc from the neck.

The closure of the present invention is characterized by the absence of a liner seal positioned to prevent bonding between the seal disc and the underside of the cap top. In the preferred forms, the cap and the seal disc are formed to inhibit the adherence of the tab to the interior of the cap. In one modification, the tab is folded back across the seal disc when inserted into the closure. The closure may include a rib protruding from the underside of the cap, partially separating the tab from the underside of the cap top and substantially preventing the formation of an adhesive bond between the cap and the neck. In other modifications, the tab depends from the peripheral edge of the seal disc and is positioned between the neck stretch portion and the interior of the upper skirt when the cap is applied to the neck. This positioning provides the means to inhibit adherence of the tab to the underside of the top.

The closure may be formed having an orientation structure, such as a tear tab, for aligning the closure relative to the container. Similarly, the container may include an orientation structure, such as a non-circular cross section, for orienting the container with respect to the closure. The orientation features may be used to achieve complete thread engagement during straight axial application. Achieving full thread engagement allows the seal disc to be accurately positioned surrounding the opening and further ensures that disc will completely adhere to the neck.

If the consumer is not concentrating on the condition of the cap when opening a container, he may not notice that the frangible section has been fractured indicating that the cap has been previously removed from the container. The seal disc of the present invention provides additional evidence of tampering. If the seal disc is missing or partially removed from the neck, the consumer is alerted to potential tampering with the contents of the container. Thus, evidence of tampering may be detected by even the inattentive consumer.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION OF THE PREFERRED EMBODIMENTS

Figure 1:
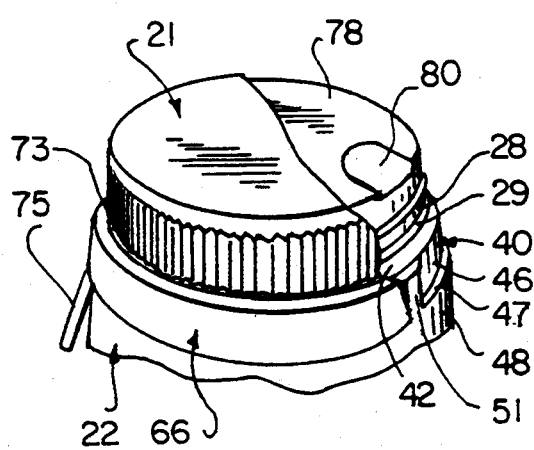
FIG. 1 is a perspective view of a cap and foil disc on a container neck, shown with the cap partially broken away.
Figure 2:
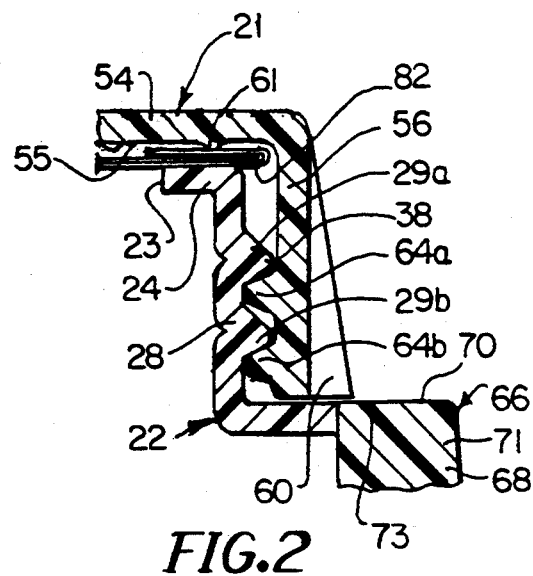
FIG. 2 is a fragmentary, enlarged sectional view of a cap and foil disc applied to a neck.

Reference will now be made in detail to the preferred embodiments of the invention, examples of which are illustrated in the accompanying drawings. While the invention will be described in conjunction with the preferred embodiments, it will be understood that they are not intended to limit the invention to those embodiments. On the contrary, the invention is intended to cover alternatives, modifications and equivalents, which may be included within the spirit and scope of the invention as defined by the appended claims.

Closure 21, hereinafter described in detail, is used with a container neck 22. The closure 21 and the neck 22 are subject to some variation, but preferably are formed for direct, axial application without relative rotation of the closure and the container. The interior of the neck 22 forms no part of the present invention. With a blow-molded bottle finish, the interior contour tends to follow that of the neck exterior. However, it will be understood that other types of bottles may be used, with the internal shape of the neck varying from that of the exterior.

In the illustrated form, neck 22 has a central opening 23 and a downward-outward slanted lip flange 24 surrounding the opening 23 and terminating in a neck stretch portion 28. Helical engagement means, such as threads 29, extend outward of stretch 28. In the illustrated embodiment, there are two threads 29a and 29b. The finish has twelve threads per inch with a double lead, each thread being six pitch and extending slightly in excess of 360° of a full thread. It is to be understood that the threads may be extended greater than 360° for increased thread engagement. Additionally, the thread leads may be of a different linear thread density (threads per inch). The continuous threads may alternatively be interrupted, or replaced with other helical engagement means such as a cooperatively shaped groove. The shape of the threads 29 permits the threads on the interior of the cap to slip past and interengage threads 29. Preferably, the thread apex 38 is made with as large a radius as possible, allowing direct axial application of cap 21 while requiring that the cap be unscrewed and not pulled from the neck.

The container neck includes tamper-evident means, such as locking wall portion 40 below the vertical stretch having a plurality of exterior ratchet teeth 51. The locking wall portion has an outward extending shoulder portion 42 and a lower neck stretch portion 46 offset outwardly relative to the upper neck stretch portion. In the illustrated embodiment, the lower neck portion slants downwardly/outwardly at an angle of approximately 10° and terminates in shoulder stretch portion 47. A vertical stretch 48 depends from shoulder 47.

Figure 1A:
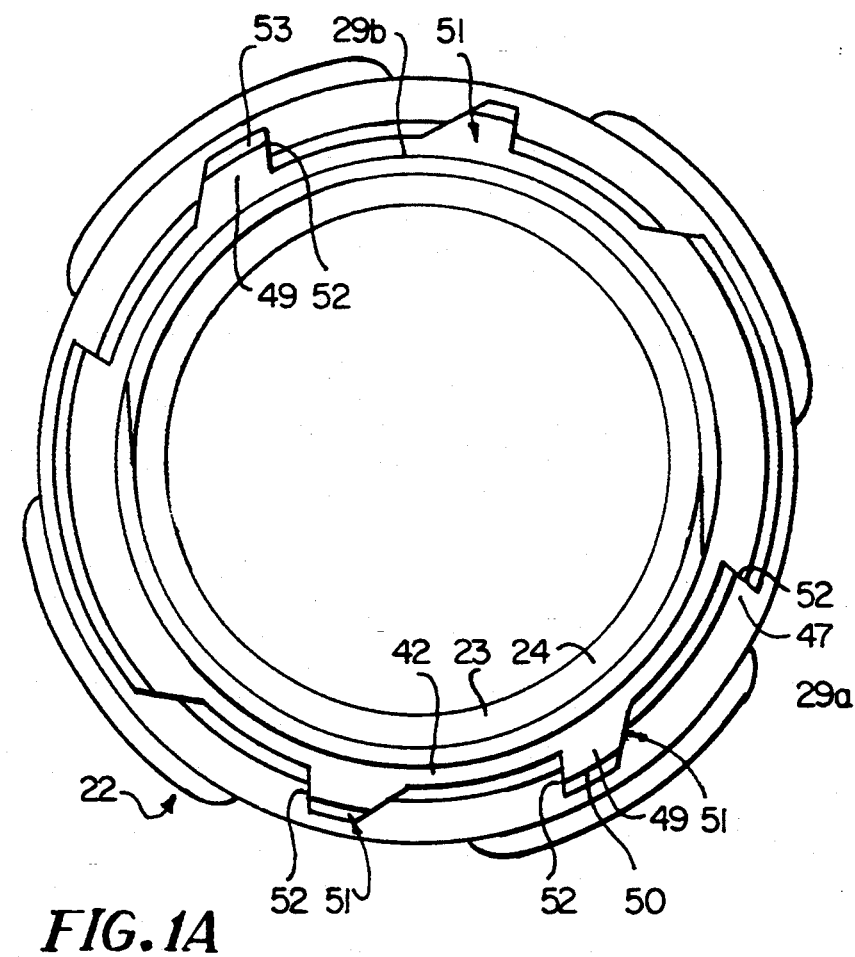
FIG. 1A is a top plan view of the container neck.

The ratchet teeth 51 are shaped to interengage the internal ratchet teeth formed on the cap, preventing twisting of the cap relative to the neck. In the illustrated embodiments, teeth 51 are formed on shoulder stretch 47. However, in alternative forms of the present invention the teeth may be located on lower stretch 46, interengaging ratchet teeth formed on the interior of the cap. As illustrated in FIG. 1A, there are typically three such teeth on one side of the container neck and three such teeth on the opposite side. The total extent of the three teeth on each side is approximately 90°. Each tooth has a top surface 49 which can be co-planar with the surface of shoulder 42. Outer surface 50 slants downward/outward at an angle of approximately 10°, terminating in shoulder 47. The front edge 52 viewed from above in plan as in FIG. 1A (assuming a right-hand thread) is disposed at varying angles from about 45° to about 0° relative to a radial line drawn perpendicular to the vertical axis and are approximately vertical.

A cap 21 for use with neck structure 22 is illustrated in FIGS. 1 to 4. The cap has a top 54 from the periphery of which depends downward extending upper skirt 56. The top as illustrated comprises a generally flat top disk; however, other configurations such as a dome shape may be substituted. The exterior of upper skirt portion 56 has spaced vertical ribs 60 to enable the user to grip the cap. An annular rib or bead 61 protrudes from the underside 55 of top 54. When the cap 21 seats on the neck, rib 61 is positioned directly above lip flange 24.

Helical engagement means, such as threads 64a and 64b, are formed on the interior of the skirt. The threads are selected to mate with threads 29 of neck 22, with the shape of threads 29a, 29b, 64a and 64b allowing the threads to slip past one another and then interengage. In the present form, the threads are continuous; however other modifications of cap 21 may include interrupted threads or alternate helical engagement means. Threads 64a and 64b are double lead and extend around the circumference of the cap in excess of 180°, for example, approximately 200°. In conventional capping machines, cap 21 is deposited on neck 22. Since threads 64a, 64b are diametrically opposed, the cap tends to rest horizontally on neck 22, facilitating the application of the cap onto the neck with a downward, axial force.

In order for the closure and container threads to effectively slip past each other during direct axial application, the threads must be finer than those of a threaded closure applied by conventional rotary application. As threads become finer, a greater amount of total thread engagement is often necessary to prevent excessive forward stripping on reapplication. A thread engagement of approximately 200° for each of the two cap threads is satisfactory for the present embodiment (i.e. 400° of total thread engagement), where the threads are double lead and formed with a thread density of twelve turns per inch. Finer threads, such as sixteen or twenty threads per inch, would require greater total thread engagement.

Figure 1B:
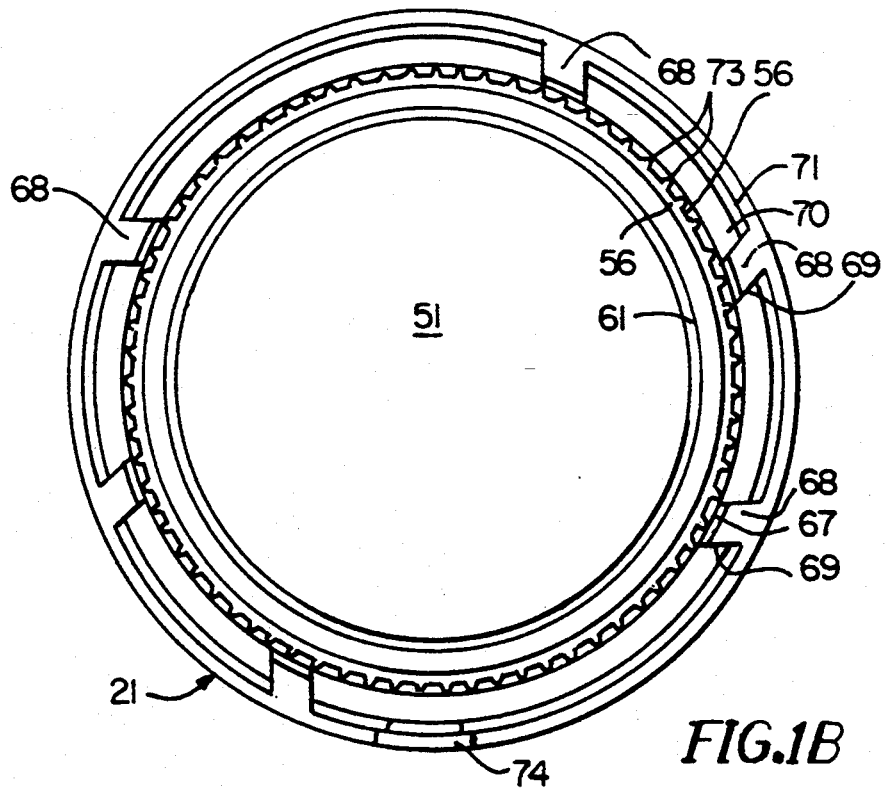
FIG. 1B is a bottom plan view of the cap.

The closure 21 has tamper-evident means, for example a tamper-evident band 66 having a number of ratchet teeth 68 formed on the interior of the band. In the present embodiment, the tamper-evident band comprises an annular shoulder 70 below the upper skirt 56, and a lower skirt portion 71 extending downward from the annular shoulder. The tamper-evident band 66 is frangibly connected to the upper skirt by a number of radially spaced bridges 73. In the present form, the bridges 73 are provided by the lower edges of ribs 60. Alternatively, a line of weakness may be formed through the intersection of shoulder 70 and upper skirt 56. The ratchet teeth 68 are shaped and positioned for cooperation with the teeth 51 formed on neck 22. When the cap 21 is pushed onto the neck, the teeth 51 and 68 interengage to prevent unscrewing of the cap with the tamper-evident band 66 intact. As shown in FIG. 1B, the inner edges 67 of the teeth are positioned close to the lower neck stretch 46 after cap application. The leading edge 69 of each tooth 68 is formed at an angle of approximately 45° to a radial line, thereby ensuring good interlock with the complementary surface 52 of neck 22. This angular relationship biases the cap 21 into a more secure locking arrangement with the neck 22.

The interlocking engagement between the teeth on the cap with those on the neck prevents twisting of the cap relative to the container while the tamper-evident band 66 is intact. The container is initially opened by rupturing the bridges 73 and separating the tamper-evident band 66 from the upper skirt portion 56. The cap may then be unscrewed and band 66 removed. The presence of the ruptured bridges alerts the consumer that the container has been previously opened, providing evidence of tampering with the contents.

In the preferred form, a tear tab 75 is joined to the lower edge of the tamper-evident band 66. The tear tab provides means for removing the lower band and may also be used to orient cap 21 relative to the container prior to application. When initially opening the container, the consumer pulls tab 75 to remove the tamper-evident band 66, rupturing frangible section 73. The absence of the lower skirt provides a more pronounced warning to the consumer that the container has been previously opened and possibly tampered with. In the preferred form, completely removing tamper-evident band 66 from upper skirt 56 aesthetically enhances the appearance of cap 21, which is used to reseal the container. However, in other forms of the present invention the lower band may be only partially removed from the upper skirt portion for separating teeth 51 from teeth 68 to unscrew the cap from the container.

When initially opening a container, the consumer grips tab 75 and pulls circumferentially around the container detaching the tamper-evident band from upper skirt 56. Ratchet teeth 68 are thereby removed from interlocking engagement with projecting teeth 51, providing evidence of tampering and enabling the consumer to unscrew cap 21 from neck 22. To replace the cap, the consumer merely reverses the direction of twisting.

Foil sealing disc or liner 78 seals the central opening 23 of neck 22. The foil sealing disc is of a commercially available type, and generally includes a tab 80 for removal of the disc from the container neck. In the preferred embodiment, the tab is integrally formed with and extends from the peripheral edge of seal disc 78. Before applying the closure 21 to the neck, the seal disc is inserted into the cap, fitting against the underside 55 of the top 54. The sealing disc is loosely retained within the cap by threads 64a and 64b until the cap is applied to the container. The bottom of the sealing disc is provided with an adhesive layer 82 which bonds with the lip flange 24 when applied to the container. In the present form, the adhesive layer is a heat sensitive compound. The compound adheres to the surface of the lip flange upon the application of heat, as by induction heating or another known method. Alternatively, the heat sensitive compound may be replaced by other known means for sealing the foil liner 82 to the container.

With the present invention, the upper surface of the sealing disc is substantially exposed to the underside of the top 54. Unlike other available foil-lined closures, cap 21 does not include a back-up liner separating the seal disc from the underside of the cap. Instead, the closure and the seal disc are formed to prevent bonding between the seal disc and the cap. In the illustrated form, tab 80 is folded back across seal disc 78, as is shown particularly in FIG. 1. The bottom surface of the tab, which is at least partially covered by the adhesive coating 82, is exposed. When the cap is applied to the container and the disc 78 is sealed to the neck, the exposed surface of the tab will slightly adhere to the underside of top 54.

Cap 21 is initially removed by unscrewing the cap from the container. The bond formed between the tab 80 and the underside 55 of the top will be sheared by the twisting of the cap. Since the tab is separated from the cap interior before the cap is lifted from the container, the seal between disc 78 and lip flange 24 will not be broken. Thus, the seal disc remains intact without requiring the use of a secondary or back-up liner for separating the tab from the underside of the top 54.

In the preferred form, bead 61 depending from the underside of the top 54 is positioned above the lip flange 24. As is shown particularly in FIG. 2, bead 61 rests against tab 80 when the cap is applied to the neck, effectively separating the adhesive-coated surface from the top 54 of the cap. The adhesive layer 82 on the exposed surface of the tab 80 may slightly adhere to the bead when the disc 78 is sealed to neck 22; however, the tab is prevented from bonding to the underside of the top by bead 61. The size and strength of the adhesive bond between the seal disc and the cap is significantly minimized, since the tab 80 solely adheres to the bead 61. The bead 61 thereby provides a means for inhibiting the adherence of the seal disc to the cap 21. Unscrewing of the cap will easily shear the bond between the bead 61 and the tab 80, preventing any premature removal of the seal disc 78. Thus, providing cap 21 with the bead 61 further eliminates the need for a secondary or back-up liner.

In the preferred form of the present invention, bead 61 extends circumferentially around the underside of top 54. The annular bead 61 enhances the application of the seal disc 78 to the neck. Once the cap is seated on the neck, the bead presses the outer edges of the seal disc against lip flange 24, ensuring contact between the adhesive layer 82 and the neck. The bead further concentrates the application of heat, directing the heat toward the weld area. The adhesive bond formed between the disc 78 and the lip flange 24 extends entirely around the central opening 23 of the neck. Thus, the seal disc completely seals the container neck, protecting the consumer by providing evidence of tampering.

Figure 3:
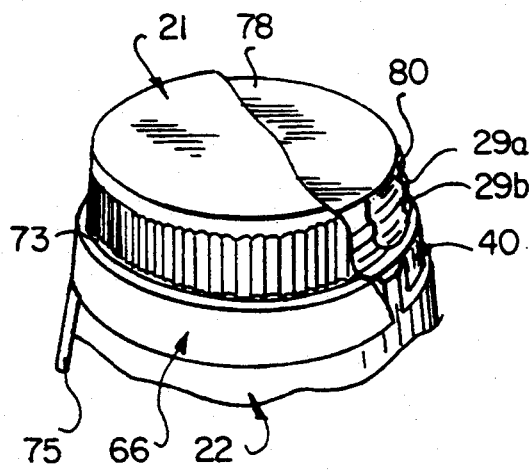
FIG. 3 is a perspective view of an alternative embodiment of a cap and foil disc applied to a container neck, shown with the neck partially broken away.
Figure 4:
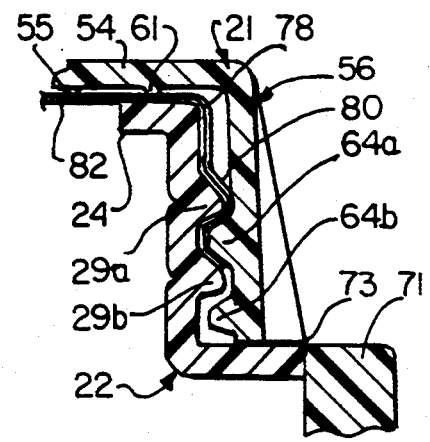
FIG. 4 is a fragmentary, enlarged sectional view of a cap and foil disc applied to a neck.

A modified form of the present invention is shown in FIGS. 3 and 4. Tab 80 is now folded to depend from the peripheral edge of the seal disc, where it extends across the cap threads 64a and 64b when the disc 78 is inserted into cap 21. When the cap is applied to the neck, the tab is positioned between the threads 29a, 29b, 64a and 64b. The positioning of the tab 80 substantially inhibits the formation of an adhesive bond between the interior of the cap and tab 80. Since the adhesive-coated surface of the tab 80 is not exposed to the underside of the top, the tab will not adhere to the cap when the disc 78 is sealed to the container. A consumer initially opening a container will unscrew and remove cap 21, exposing the seal disc. Disc 78 is then conveniently removed by gripping tab 80 and pulling the seal disc from the neck. Since the tab does adhere to the interior of the cap, the seal disc will not be prematurely removed from the neck with the cap.

With the present form, the adhesive-coated surface of the tab is exposed to the neck stretch portion 28, and the tab is held between the interengaged threads 29a, 29b, 64a and 64b. The orientation of the tab 80 relative to the seal disc 78 and the shape of the threads 29a and 29b inhibits adherence of the tab to the neck. In the event an adhesive bond does form between the tab and the neck, the tab will be easily separated from the neck by simply lifting tab 80 to remove the seal disc.

In the preferred form, seal disc 78 is inserted into cap 21 with tab 80 oriented opposite tear tab 75. With the capping machines known in the bottling art, the neck of a container passing below the capping machine contacts lower skirt portion 71 to "pick" or catch cap 21, positioning the cap on neck 22 with tear tab 75 trailing. When the tab 80 is positioned adjacent tear tab 75, the tab 80 may accidentally be inserted into opening 23 during the capping process. Orienting seal disc 78 with the tab 80 positioned 180° relative to the tear tab 75 substantially prevents the tab 80 from falling within neck opening 23.

Figure 6:
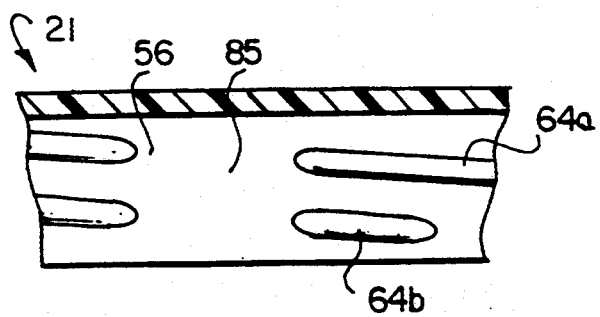
FIG. 6 is a fragmentary, enlarged sectional view of the interior of a cap.
Figure 5:
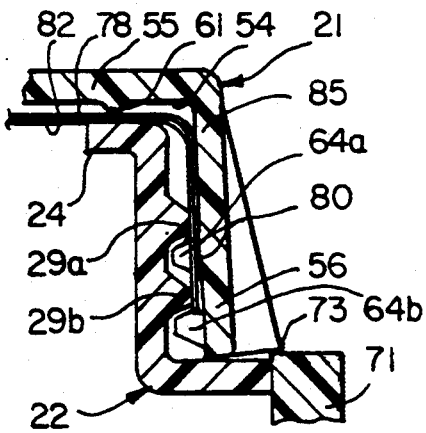
FIG. 5 is a fragmentary, enlarged sectional view of another embodiment of a cap and foil disc applied to a neck.

Another modification of the present invention is shown in FIGS. 5 and 6. The interior of the upper skirt portion 56 is formed with a recessed portion, generally designated at 85. The recessed portion is defined by interruptions in closure threads 64a and 64b. Seal disc 78 is inserted into the cap 21 with tab 80 depending from the disc proximate the recessed portion 85. As is shown particularly in FIG. 5, once the cap is seated on the neck, the tab 80 is positioned between the interior wall of the upper skirt portion and neck threads 29a and 29b; the tab 80 does not extend across threads 64a and 64b. Since it fits within the recessed portion 85, tab 80 is not deformed to follow the shape of the interengaged threads. Instead, the tab 80 solely contacts thread apex 35.

When the seal disc is adhered to lip flange 24, the adhesive-coated surface of tab 80 may adhere to the neck threads 29a and 29b. However, since the tab only contacts the thread apex, the size and strength of the adhesive bond is substantially minimized. A consumer may easily shear any bond between the tab 80 and the neck simply by lifting the tab. Thus, the consumer is provided with convenient access to the tab 80 for efficiently removing seal disc 78 to initially open the container.

PREFERRED OPERATION

After the container has been filled, it is transported through a capping machine. As is well understood in the bottling art, and in a manner similar to that whereby push-on, pull-off caps are applied, caps 21 are fed one at a time out of a bowl in the capping machine, the tear tabs 75 orienting the caps so that they are all discharged in a pre-determined orientation relative to the containers which pass therebelow. Each container has a non-circular cross section or some other variation from a round shape, which permits the container to be oriented relative to cap 21. The structure of capping machines is well known in the bottling art. Because of the relative orientation of the cap 21 and container neck 22, the teeth 68 of the cap are in vertical alignment with the teeth 51 of neck 22.

An axially downward force is applied to cap 21 causing it to move down. As it moves down, the threads 64a and 64b slip over the threads 29a and 29b, the slanted surfaces of the threads 29a and 29b facilitating such movement. The cap 21 is sufficiently resilient so that it expands outward sufficiently to permit the threads to slip. As the cap 21 seats on the neck, teeth 68 engage behind the teeth 51 to fully seat the teeth 68 in place. After the cap has been fully seated on neck 22, it may not be removed without providing evidence of tampering. Thus the interengagement between teeth 51 and 68 prevents unscrewing of the cap from the container, while the interengagement between the threads prevents lifting of cap 21 off neck 22.

As is apparent from the foregoing discussion, the present invention provides a tamper-evident foil lined closure for a container. The closure does not require the use of a secondary or back-up liner to prevent the foil disc from adhering to the container. Instead, in the various modifications of the present invention the closure and seal disc are formed to substantially inhibit adherence of the seal disc to the interior of the closure. Eliminating the need for a second liner substantially reduces the cap manufacturing and assembly costs.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. In combination, a container having a neck and a container closure, said neck being of the type having an upper opening, a lip surrounding said opening, a neck stretch portion depending from said lip, said neck stretch portion having an exterior, at least one first helical engagement means formed on said exterior of said neck stretch portion, and first tamper-evidencing means, said closure being of the type having a top, said top having an underside, an upper skin portion depending from said top, said upper skirt portion having an interior, at least one second helical engagement means formed on said interior of said upper skirt portion, and second tamper-evidencing means, said closure being resilient and said first and second helical engagement means being shaped to slip past one another and interengage upon direct axial downward movement of said closure relative to said neck without relative rotation of said closure and said neck, one of said first tamper-evidencing means and said second tamper-evidencing means being frangible, said first and second tamper-evidencing means being shaped and positioned to interengage once said closure is seated on said neck upon said direct axial movement, the improvement in said combination comprising a seal disc positioned underneath said top prior to application of said closure to said neck and said second helical engagement means comprising means for holding said seal disc in said closure, said seal disc covering said opening and substantially sealing with said neck after said closure is applied thereto, said seal disc having a tab for removal of said seal disc from said neck, said tab being positioned to prevent adherence of said tab to said underside of said top or to said interior of said upper skirt portion when said seal disc is applied to said lip and substantially sealed thereto, and said closure having a lower skirt portion below said upper skirt portion, said second tamper-evidencing means being frangible and forming a line of weakness between said upper skirt and said lower skirt, and orientation means depending from said lower skirt to orient said closure relative to said container when said closure is applied to said container.

2. The combination of claim 1 in which said orientation means comprises a tear tab which may be gripped by the user to separate said lower skirt from said upper skirt.

3. The combination of claim 1 wherein said orientation means is substantially diametrically opposite said tab on said seal disc when said closure is viewed in bottom plan.

4. The combination of claim 3 wherein said tab on said seal disc extends downward between said neck stretch portion and said upper skirt portion of said closure.

5. The combination of claim 1 wherein, said second helical engagement means includes at least one interruption providing said interior of said upper skirt portion with a recessed portion formed for receiving said tab, and said tab is positioned proximate said recessed portion, whereby said tab is held within said recessed portion between said interior of said upper skirt portion and said exterior of said neck stretch portion when said closure is seated on said neck.

6. The combination of claim 1 wherein, said neck has a peripheral lip flange surrounding said opening, and said seal disc substantially seals with said lip flange after said closure is applied to said neck.

7. The combination of claim 6 wherein, said closure includes an annular rib on said underside of said top, said annular rib retaining said seal disc against said lip flange for the formation of a seal between said seal disc and said lip flange after said closure is applied to said neck.

8. The combination of claim 1 wherein, said seal disc is a foil disc.

9. The combination of claim 8 wherein, said foil disc has a coating applied to one surface thereof, said coating being of a heat sensitive material such that upon heating, said coating forms a seal between said seal disc and said lip flange.

* * * * *